(12) United States Patent
Zuta

(10) Patent No.: US 6,278,409 B1
(45) Date of Patent: Aug. 21, 2001

(54) WIRE DETECTION SYSTEM AND METHOD

(76) Inventor: Marc Zuta, 19 Ben Yehuda Street, Petah Tikva 49373 (IL)

( * ) Notice: Subject to any disclaimer, the term of this patent is extended or adjusted under 35 U.S.C. 154(b) by 0 days.

(21) Appl. No.: 09/438,286

(22) Filed: Nov. 12, 1999

(51) Int. Cl.[7] .................................................. H01Q 19/00
(52) U.S. Cl. ........................... 343/756; 343/705; 342/29; 342/188
(58) Field of Search .................................. 343/705, 708, 343/725, 756, 767, 770, 793, 909; 340/946; 342/29, 59, 188

(56) References Cited

U.S. PATENT DOCUMENTS 4,062,010 * 12/1977 Young et al. ........................ 343/797
4,737,788 * 4/1988 Kenedy ................................. 342/29
5,264,856 * 11/1993 Thurlow ............................... 342/188

* cited by examiner

*Primary Examiner*—Tan Ho (57) ABSTRACT

A system for wire detection comprising a transmitter for transmitting multi-polarity waves, means for receiving waves reflected off target and means for analyzing the polarization of the reflected waves to detect linearly polarized echoes characteristic of wires and to issue a warning indicative of the presence of a wire. The wavelength of the transmitted waves is larger than the diameter of the wires to be detected. A method for wire detection comprising the following steps, for each of a plurality of angles U between 0 and 180 degrees: a. Transmit pulses of electromagnetic waves having a linear polarization at an angle U to horizontal; b. Receive echoes at the same polarization angle U; c. Prepare a map M(U, R) with the magnitude of the received echo for each angle U and each ground cell at range R.

15 Claims, 4 Drawing Sheets

WIRE DETECTION SYSTEM AND METHOD

CROSS-REFERENCE TO RELATED APPLICATIONS

This application claims priority from Israel Patent Application No. 123626 filed on Mar. 11, 1998 in Israel and entitled "Wire detection system and method" and from the PCT patent application No. PCT/IL99/00139 filed on Mar. 11, 1999 with the same title and claiming priority from the abovementioned Israel application.

FIELD OF THE INVENTION

The present invention relates to systems for detection of wires, and more particularly to such systems for detecting wires using polarized radio waves.

Heretofore, various systems were devised to detect suspended wires, which form an obstacle for helicopters and for low flying light aircraft. Various wires include high voltage power cables, medium voltage cables, telephone cables and more.

Helicopters may collide with these wires, with fatal consequences. The problem is that it is difficult to see wires from the air, on the dark background of the ground. This is difficult at daytime in a good weather. It is impossible to see wires at night or in bad weather.

Suspended wires are more dangerous to helicopters than other ground obstacles. Ground obstacles usually have a relatively small width and height, whereas wires are located higher and span a large width, so the danger of collision with wires is much higher. Therefore, it is important to distinguish suspended wires from other ground reflectors and to warn the pilot accordingly.

Prior art sensor systems apparently do not detect wires effectively. These include, for example, millimeter wave radar, laser radar, FLIR and more. These prior art systems are complex, heavy and costly and only achieve a limited success in detecting wires. There is a need for a light weight, simple structure system for wire detection and pilot warning.

Following is a description of prior art systems for wire detection.

Thurlow, U.S. Pat. No. 5,264,856, discloses a system and method for detecting radiant energy reflected by a length of wire. The system has two antennas that transmit and receive at two fixed polarizations that are orthogonal to each other. The system measures three values of echo return: Svv, Svh and Shh, that correspond to all the combinations of transmit and receive at a horizontal (h) and vertical (v) polarization. The system then computes the polarization of the target based on the above three values. The result is presented on a Poincare Sphere, wherein circular polarization nulls lay on the poles of the sphere, whereas linear polarization nulls lay on the equator of the Sphere. Where two nulls coincide and are located on the equator of the Sphere, this is an indication of a wire target.

The system in Thurlow does not actually measure the echoes in a polarization parallel to a wire and normal to the wire; rather, it uses two fixed polarizations for transmit and receive, and uses a rather complex calculus to evaluate the polarization of the wire (if indeed there is a wire).

A possible problem in Thurlow is the effect of ground clutter. Ground clutter, like a radar target, has a specific scattering matrix that may also be represented as (Svv, Svh, Shh). Actually, the system in Thurlow measures the sum of clutter and wire in each dimension of the matrix. As each component of the matrix is corrupted with clutter, the location of the resulting nulls may move randomly over the surface of the Poincare Sphere. The ground return (clutter) has a complex value (I, R) for each of the three components of the scattering matrix; each component is unrelated to the scattering from a wire located in that area. Therefore, a gross error in the null location may result.

Furthermore, the clutter return is not fixed. The scattering matrix for ground clutter is a statistic value with one or more parameters. Thus, the values in the scattering matrix (Svv, Svh, Shh) may vary from pulse to pulse, with corresponding variations in the computed nulls.

It may be difficult, under the circumstances, to have a null on the desired equator of the Sphere; to have two nulls may be more difficult still.

One way to reduce the influence of clutter is to increase the resolution of the radar. Indeed, Thurlow indicates using range intervals of 10–30 meters that are further divided into 32–128 range gates. An interval of 10 meter divided to 128 will result in a range gate of about 8 cm (centimeter), that would require a radar of a wavelength of 0.8 cm or less. These waves may not be capable of detecting real world wires using the polarization effect.

It is known that wires only reflect a linear polarization when the wavelength of the waves is significantly longer than the diameter of the wires. Preferably, the wavelength should be more than about 3 times the wire diameter. For this case, the "thin wire" approximation applies, that is the wire does not reflect waves at a polarization normal to the wire.

Electrical wires now in use may have a diameter of about 1 inch (about 2.5 cm). The radar in Thurlow, with a wavelength of about 0.8 cm or less, will receive echoes in both polarizations, so it may not detect a linear polarization indicative of wires.

Thurlow gives no indication nor suggestion regarding the frequency of operation of a radar that has to detect wires based on polarization discrimination. There is no suggestion on how to concurrently achieve two opposite goals, that is a high radar resolution and long wavelength for stimulating the linear polarization characteristics in real world wires.

The clutter problem is further aggravated in Thurlow by the fact that the wire orientation is usually different than that of the transmitted and received waves. Thus, whereas the system transmits horizontally- and vertically polarized waves, a wire may have an oblique orientation. This may be a result of the geography of the place, or of a maneuvering aircraft.

For example, with a wire at an angle of 20 degrees to the horizontal antenna of the system, for a horizontally polarized transmit wave E, the component parallel to the wire will be $E*\cos(20)$. The wave reflected off the wire will be at 20 degrees, so it will again be attenuated when received at the horizontal antenna by the factor $\cos(20)$. Thus, the wave received at the radar for a horizontal/horizontal case, is attenuated by $\cos(20)^2$. This is the electrical component of the wave; the received power is attenuated by the square of that value, that is by a factor of $\cos(20)^4$. Here, "^4" denotes the fourth power of the value it succeeds.

It is known that $\cos(20)=0.94$ (all the values here are approximations). Therefore, $\cos(20)^4=0.78$ or 1.1 dB.

Thus, the component Shh is attenuated by a factor of 1.1 dB relative to that of a horizontal wire.

Similarly, the component Svv will be attenuated by $\cos(70)^4$ relative to a vertical wire, and the component Svh is attenuated by $(\cos(20)*\cos(20))2$.

Thus, in this example, the loss or attenuation in the matrix components will be:

Shh is reduced by 1.1 dB
Svv is reduced by 18.6 dB
Shv is reduced by 9.9 dB

To detect a target in clutter (a Yes/No decision) a S/C ratio of about 14 dB is required. To compute spatial orientation of vectors, a better ratio may be required, otherwise the direction may be in gross error. Assuming a S/C ratio of 20 dB, to reliably measure the Shv component the radar has to achieve a S/C of 30 dB or better; for the Svv component, an S/C ratio of 38 dB or better is required.

Therefore, to measure these components, an exceptionally high signal/clutter ratio may be required. This may be difficult to achieve because of the abovedetailed bandwidth limitation or other practical limitations. In a practical implementation, therefore, the computation in Thurlow may be largely based on clutter rather than the wire returns, so that the location of the computed nulls may be in gross error.

Wires may not be detected, or clutter may erroneously give false alarms.

A complex data processing may be required, to map radar echoes into a tri-dimensional Poincare Sphere. Moreover, tri-dimensional pattern recognition may be required to identify possible targets (wires).

Young et al., U.S. Pat. No. 4,062,010, discloses an underground pipe detector. The system uses a first dipole for transmit and a second dipole for receive, with the two dipoles being perpendicular to each other. In Young, the normal angle between the dipoles is used to achieve a transmit-receive isolation. The system transmits a fixed linear polarization and receives a linear polarization that is perpendicular to the transmit polarization.

The system in Young is optimized for detecting underground pipes, with an air-ground boundary about normal to the antenna and ground layers also about normal to the antenna. The pipe is located at a short distance from the antenna.

In this environment, the interface surface of various strata beneath the ground surface will not create clutter, as these surfaces do not change the polarization of a radiated signal. That is, the polarization of transmitted waves will not be affected by these irregularities in the ground.

A wire in the ground, however, will change the polarization of the waves, that will be detected in the receiver dipole.

The clutter from the air-ground interface is kept low with an antenna that is close to the ground and with a layer of an absorber material.

Such a system may not be effective in detecting wires in the air, over ground clutter. Here, clutter may reflect waves in a polarization normal to that of the transmitted waves. Thus, a receiver antenna normal to the transmit antenna will receive echoes of significant power even when no wire is present. See also the description above relating to Thurlow.

The wave energy absorbing means in Young are adapted for detecting targets beneath the surface of the ground (to reduce multiple reflections there), however they are not adequate for a radar that is to detect suspended wires in the air, at a longer range (where that material reduces the transmit power, reduces sensitivity and does not contribute toward reducing ground clutter).

Kennedy, U.S. Pat. No. 4,737,788, discloses a helicopter obstacle detector using a pulsed Doppler radar. A transmit/receive antenna is mounted near the tip of the helicopter's rotor blade for sensing obstacles in the helicopter's path. The rotor tip velocity shifts the frequency of radar echoes. The movement of the antenna achieves a synthetic radar antenna array with improved directionality. The antenna transmits a horizontal polarization and uses Doppler shift to distinguish wires in the plane of the helicopter rotor. Wires that are located in the plane of the rotor and have a maximal Doppler shift, whereas ground echoes are displaced in angle from the tangential velocity vector and therefore have lower Doppler shifts.

Thus, the system in Kennedy is intended to detect wires whose height is known beforehand, and wherein the helicopter flies at a specific altitude wherein the rotor is at the same height as the wire. Otherwise, the wire will appear at a slant elevation angle and its Doppler will be reduced as well.

Moreover, if the terrain is not perfectly flat, then at some range a ground patch may be at the height of the rotor, thus resulting in a maximal Doppler, equal to that expected from wires.

The vertical angle between the wire and the rotor's plane determines the maximal Doppler shift; as that angle may change, the Doppler shift may change as well. This presents the problem of setting a narrow filter to receive the Doppler shift of a wire—if the filter is not set to the correct Doppler shift, it will not detect a wire.

Another possible problem in Kennedy is that the plane of rotation of the main rotor is not necessarily horizontal. Actually, that plane may be changed by the pilot, to generate a forward thrust.

Thus, the plane with the maximal Doppler shift may intersect the ground at some range that varies according to flight characteristics, even for a planar ground. The problem is aggravated when flying a hilly terrain.

In order to detect wires to prevent a collision with wires, the rotor in Kennedy has to rotate in a horizontal plane, at the same height as the wire to be detected, and the helicopter has to fly a horizontal path. In real life, however, the plane of the rotor is tilt relative to horizontal, the wire may be at a different height, and the helicopter may fly an ascending or descending path. In this case, a wire may not be detected, or ground clutter may generate false alarms.

It may be difficult to locate a radar system near a rotor's tip that moves close to the speed of sound, from aerodynamic considerations. The radar may create an asymmetry between the rotor blades, because of the centrifugal forces, thus generating dangerous forces or moments on the rotor axis.

The radar should be so construed as to withstand the significant centrifugal forces generated by the rotor. Moreover, costly means for transferring signals and power between the rotating system and the helicopter's body may be required.

An airborne obstacle collision avoidance apparatus is disclosed in U.S. Pat. No. 5,448,233 by Izhak Saban et al. The apparatus includes an object sensor for sensing objects within a field of view of the aircraft and an aircraft navigation system. Israel patent No. 104542.

Israel application No. 109392 assigned to Northrop Grumman Corporation, discloses a system for sensing objects in the flight path of an aircraft. The system comprises means in the form of a laser radar subsystem for emitting a beam of laser energy, for receiving returns from objects, and for processing the returns.

Israel application No. 110741 assigned to United Technologies Corporation, discloses a wire cutter system having aerodynamic, microwave energy absorbing fairing. The system includes wire cutter means and a fairing for covering the cutter means.

U.S. Pat. No. 5,465,142 by Krumes et al., discloses a system for sensing objects in the flight path of an aircraft and alerting the pilot to their presence. The system includes a laser radar subsystem for emitting a beam of laser energy, receiving returns from objects, and processing the returns.

U.S. Pat. No. 5,371,581 by Wangler et al., discloses a helicopter obstacle warning system includes a horizontally rotating beam from a laser rangefinder which detects and measures the distance to ground objects which may present a hazard to a helicopter during hover, takeoff and landing.

U.S. Pat. No. 4,528,564 by Trampnau, discloses a warning device for helicopters with a tail rotor and a mechanical protection device therefor. The warning device comprises a height-finder with a transmitting/receiving antenna mounted at the helicopter tail to produce a height-finding beam.

U.S. Pat. No. 5,210,586 by Ludger et al., discloses an arrangement for recognizing obstacles for pilots of low-flying aircraft. The system includes a pulsed laser range finder for scanning a given field of view and for the pictorial presentation of the course of a perceived obstacle.

EP 391328 A2 by Giulio et al., discloses an obstacle detection and warning system particularly well suited for helicopter applications. The system includes a laser emitter which scans the surrounding space by means of an acousto-optical deflector.

U.S. Pat. No. 5,451,957 by Klausing, discloses a radar device for obstacle warning. A radar device has a synthetic aperture based on rotating antennae preferably for helicopters, which operates in the millimeter-wave range and is used mainly as an obstacle radar.

U.S. Pat. No. 4,695,842 by Jehle et al., discloses an aircraft radar arrangement, particularly for helicopters. A dual frequency system uses a first frequency of 60 GHz for obstacle warning, and a second frequency of 50 GHz for moving target detection and navigation.

U.S. Pat. No. 4,902,126 by Koechner, discloses a wire obstacle avoidance system for helicopters which includes a solid state laser transmitter which emits radiation in the near infrared wavelength region. The return signals are compared with the transmitted laser lobes. The range information is displayed to the pilot who then takes evasive action.

U.S. Pat. No. 4,572,662 by Silverman et al., discloses a wire and wire like object detection system. An optical radar operating in the infrared region of the spectrum and add to efficiently detect elongated targets such as wires. The pulsed transmitter is preferably passively Q-switched and produces optical pulses polarized in one direction.

U.S. Pat. No. 4,417,248 assigned to Westinghouse Electric Corp., discloses an adaptive collision threat assessor including a monopulse radar with a system to adaptively assess a detected threat in accordance with the relative bearing representative measurements thereof.

These are used to determine the collision potential of the threat with the radar. A comparison test is conducted at each of the selected number of time increments.

U.S. Pat. No. 4,638,315 by Raven et al., discloses a rotor tip synthetic aperture radar including a rotor, a radar receiver positioned in the rotor and for relaying received signals to a second position such as the cab of a helicopter. A radar receiver and transmitter located within the second location for transmitting radar signals toward a target and for receiving target reflected signals relayed from the rotor tip. The Doppler frequency shift imposed on the relayed target reflected signals is canceled by generating a pilot signal.

U.S. Pat. No. 5,296,909 by Fazi et al., discloses a detector of suspended cables for avionics applications. The system includes a scanning system with a noise generator and scan concentrator, a lidar system and an extractor system. The latter is composed of a background filter and a chain extractor. This detector is included in the on-board instrumentation of light aircraft and helicopters.

U.S. Pat. No. 4,362,992 by Young et al., discloses a system and method of detecting the proximity of an alternating magnetic field, such as that emanating from power transmission cables. The system comprises a sensor coil sensitive to the magnetic field under detection, processing means, and canceling means operable to cancel the earth's field.

U.S. Pat. No. 4,068,124 by Kleider, discloses a wire obstacle warning system. The system includes a linear CCD sensor array included in the gated optical radar which is particularly adapted to permit pattern recognition of wire or wire-like obstacles during low-level flight of the radar platform, e.g. helicopters or the like.

U.S. Pat. No. 5,486,832 by Hulderman, discloses a radar apparatus that includes a millimeter-wave radar transmitter comprising a flood beam antenna, and a radar signal processor for processing radar return signals to produce radar output signals.

An RF sensor comprising a receive antenna includes a plurality of antenna elements, a plurality of respectively coupled to outputs of the plurality of antenna elements and coupled to the transmitter.

U.S. Pat. No. 5,047,779 by Hager, discloses an aircraft radar altimeter with multiple target tracking capability. The radar includes a programmed microcontroller which permits effective simultaneous tracking of at least two targets such that, for example, both ground and obstacles on the ground can be simultaneously tracked, thus avoiding crashes.

U.S. Pat. No. 5,442,556 by Boyes et al., discloses an aircraft terrain and obstacle avoidance system. The system generates in the aircraft a warning signal when the aircraft is on a potentially hazardous course. The system involves the computation of pull-up trajectories which the aircraft could carry out at a reference point on the current aircraft flight path.

SUMMARY OF THE INVENTION

It is an object of the present invention to provide a system for detection of wires using polarized radio waves.

According to one aspect of the invention, the system transmits multi-polarity waves, that is waves that have more than one linear polarization component. For each transmitted polarization, a receiver in the system analyzes the received echoes to detect linear polarized waves that are characteristic of wires.

In one embodiment, linearly polarized waves are transmitted and the polarization of received waves is measured. Linearly polarized echoes are indicative of a wire in the area.

In another embodiment, linearly polarized waves are transmitted and the same polarization is used to receive reflected waves. The variations in the reflected waves with respect to the transmit/receive polarization, are indicative of the presence of a wire.

Antennas with polarization control capability are used, that are capable of transmitting and receiving waves at a desired polarization, together with radar transmitter means and receiver means.

In a preferred embodiment, the radar transmits a linearly polarized wave and receives waves with the same polarization orientation. This achieves a better polarization selectivity.

Coherent and/or noncoherent integration may be performed for each polarization.

According to a second aspect of the invention, antennas with polarization control capability are installed in a helicopter or airplane to provide forward detection capability and optional lateral detection capability as well.

The system uses waves having a wavelength that is longer than the diameter of the wires to detect, to stimulate and exploit the polarization properties of thin wires.

A possible problem in polarization measurements is that the ground clutter itself may exhibit some polarization effects (a different scattering in the horizontal and vertical polarizations). To correct for this effect, additional signal processing may be used to measure the average polarization of the clutter and to use these measurements as a threshold for a decision regarding the presence of a wire. That is, the presence of a wire in a radar range cell is expected to result in polarization characteristics that are different than those in surrounding cells.

According to another aspect of the invention, digital signal processing may be used to compute the expected time to collision and to warn the pilot if that time is less than a predefined threshold.

Further objectives of the present invention will become apparent to people skilled in the art upon reading the following detailed description and drawings.

BRIEF DESCRIPTION OF THE DRAWINGS

The invention will now be described by way of example and with reference to the accompanying drawings in which:

FIGS. 3A–3E illustrate several means for generating polarized electromagnetic waves, with FIG. 3A detailing an embodiment with a rotating dipole, FIG. 3B including a fixed horizontal/vertical dipole pair, FIG. 3C including a fixed dipole pair rotated 45 degrees, FIG. 3D including a helical dual polarization antenna.

DETAILED DESCRIPTION OF THE PREFERRED EMBODIMENTS

A preferred embodiment of the present invention will now be described by way of example and with reference to the accompanying drawings.

Figure 1A:
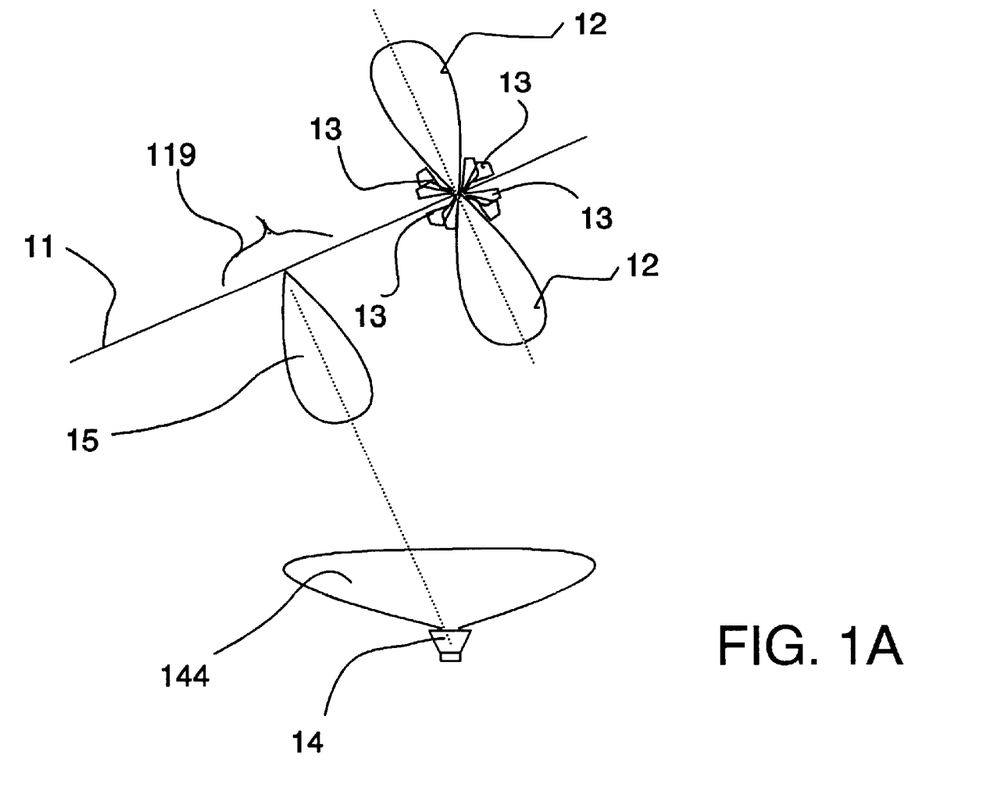
FIG. 1A illustrates the wave reflection characteristics of wires, with the spatial directionality of reflection.
Figure 1B:
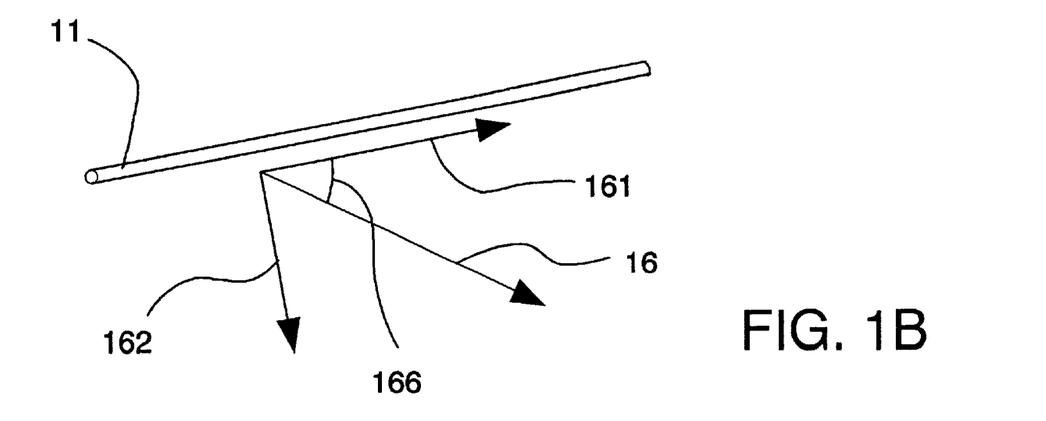
FIG. 1B illustrates the polarization characteristics of wires.

FIGS. 1A–1B illustrate the wave reflection characteristics of wires, with FIG. 1A illustrating the spatial directionality of reflection of wires in a generally horizontal plane. The horizontal plane includes a suspended wire 11 and an electromagnetic waves transmitter 14. Let us assume a wide angle antenna pattern 144 of transmitter 14, to transmit waves in a wide angular sector.

It is known that wires have a directional pattern of waves reflection, including a strong broadside return 12 in a direction normal to the wire 11, and sidelobes 13 in other directions.

The reason is that in a direction normal to the wire, a relatively long sector of wire (several wavelengths) reflects waves in phase, so that the reflected waves add coherently to form a strong reflected waves vector. In other directions, the reflections from various parts of the wire add at varying phases so that the vector sum is smaller, this creating the sidelobes 13.

When transmitter 14 sends electromagnetic waves in all directions and there is a wire 11, then part 119 of the wire may be normal to the transmitter 14. That part 119 will reflect a strong wave toward the transmitter 14, that corresponding to the broadside return 15.

The novel system in the present invention utilizes this effect for suspended wire detection: A transmitter 14 with a wide antenna pattern 144 is used. If there is a wire in the area that is illuminated with the pattern 144, then part of the wire may be normal to the transmitter 14 and will generate a strong reflected wave toward transmitter 14.

This strong return may be used to detect the wire against the ground clutter, since the clutter usually includes reflections from a plurality of reflectors which add noncoherently.

A transmitter needs not know the direction of the wire; if a broad angle transmission is used, if there is a wire it will so happen that part of the wire, that is normal to the transmitter, will generate a strong reflected wave.

A benefit of this structure is a simple, robust structure. There is no need for antenna scanning means. The cost is reduced.

Suspended wires are supported from pylons (not shown). If there is a pylon in the illuminated area, it may also result in a strong return. Various types of pylons have characteristic polarization echoes, that may help their identification as such.

Pylon detection may be important where wires change direction and the broadside reflection section 119 of the wire 11 is further away.

In another embodiment of the invention, a narrow pattern 144 of transmitter 14 is used rather than a wide pattern. The narrow beam is made to scan in azimuth. When the beam is normal to a wire 11, then a strong reflected wave will be detected at transmitter 14 (assuming there is a receiver co-located with the transmitter to detect reflected waves, or connected to the same scanning antenna).

This structure has two benefits: It measures the direction to the wire, and it achieves a longer detection range. When a wire is detected at a specific angle, that angle is indicative of the direction of the wire itself. Thus the radar measures the range to the wire as well as the orientation of the wire. The additional information may be displayed to the pilot, to help him decide on an adequate wire avoidance procedure. A narrow beam will receive less ground clutter, thus the wire reflection may be detected at larger distance.

Furthermore, a directional beam will better detect the pylons that support the wires.

In still another embodiment, transmitter 14 has (not shown) multiple fixed lobes, with the transmitter sequentially activating each lobe to transmit in another direction.

When waves are transmitted in a lobe which is normal to a wire suspended in the area, then a strong return will be detected, this strong return corresponding to the broadside return from the wire.

Other means for achieving a directional pattern may be used, for example DBS (Doppler Beam Sharpening), as detailed with reference to FIG. 4.

FIG. 1B illustrates the polarization characteristics of a thin wire 11 in a generally vertical plane for the broadside return 12 described above. An electrical field vector 16 is the instantaneous orientation of waves polarization. Waves generated in a transmitter 14 may have, as an example, that polarization at a given time. Vector 16 comprises a parallel electrical field component 161, which is parallel to wire 11 and normal electrical field component 162, which is normal to wire 11.

Any vector can be shown as comprising two components normal to each other, in any desired orientation. Of special interest is a frame of reference with one axis parallel to the wire 11 and the other normal to it. It is known that a very thin wire reflects waves having a polarization parallel to the wire and will not reflect waves having a polarization normal to the wire. Thus, when an electromagnetic wave having a polarization (electrical field orientation) as indicated with vector 16 illuminates a thin wire 11, only the parallel component 161 will be reflected. The normal component 162 will pass through as if the wire 11 did not exist at all.

Thus, no matter what is the polarization 16 of the waves illuminating a wire 11, the reflected waves will always have a linear and constant polarization 161 corresponding to the orientation of the thin wire. The illuminating waves may be linear (then vector 16 indicates the constant polarization of the transmitted waves) or circular (in which case vector 16 illustrates the instantaneous orientation of a rotating vector). In all cases, the reflected waves will have a linear polarization parallel to the orientation of wire 11.

Various types of transmitted wave polarization may be used; in any case, the radar will detect the linear reflected waves characteristic to wires. To achieve the effect of measuring the polarization of the target, the system should transmit multi-polarity waves, that is waves that have more than one linear polarization component. A receiver in the system analyzes the received echoes to detect linear polarized waves that are characteristic of wires. Preferably, the receiver is set to receive a linear polarization in the orientation of the transmitted waves. This achieves better polarization selectivity.

There are various methods for generating multi-polarity waves: a linearly polarized antenna that is rotated, two cross-polarized linear antennas that transmit alternately, a circular or elliptical polarized antenna, as detailed below.

As vector 16 changes its orientation and the angle 166 to wire 11 changes, the magnitude of component 161 changes as Magnitude(161)=Magnitude(16)*cos(angle 166)

Thus, if a rotating linear polarization is transmitted, then the reflected waves will have a sinusoidal amplitude modulation, with the frequency of modulation corresponding to the rate of rotation of the transmitted waves. This may be implemented with a linearly polarized antenna (i.e. a dipole) that is mechanically rotated about a central axis.

If polarized antennas are used both for transmit and receive with both antennas having the same instantaneous polarization, then the received echo will include a square of the above coefficient, that is cos(angle 166)^2

The reason is that only part of the wave illuminating wire 11 will be reflected, that is the component 161 which is parallel to the wire. This component is the vector 16 attenuated by a factor cos(angle 166).

The reflected waves have a polarization parallel to wire 11, that is at an angle 166 with the polarization of the antenna in the wire detection system. When the reflected waves reach the antenna, only part of the waves will be received in antenna, thus again the waves are attenuated by a factor cos(angle 166).

Thus the total attenuation factor is cos(angle 166)^2.

This achieves better polarization selectivity, as detailed below.

The detected wires need not be horizontal: Using a radar of variable polarization, there will be a first polarization angle resulting in a strong (maximal) return, and a second polarization angle resulting in a weak (minimal) return. The first angle corresponds to polarization parallel to the wire, whereas the second angle corresponds to a polarization normal to the wire.

Thus, the novel radar will also detect wires suspended at an angle, as is to be found, for example, in a mountainous area.

The polarized reflection effect described with reference to FIG. 1B only applies to thin wires, that is to wires whose diameter is small relative to the wavelength of the waves. The reason is that for higher frequency wavelength the cable appears to have a finite diameter and will reflect waves in any polarization.

If the wire has some nonzero diameter, a small amount of the normal component 162 will be reflected, although greatly attenuated.

Thus, in a millimeter wave radar the abovedetailed polarization effect cannot be used, since electrical cables have a diameter up to about 1 inch or 2.5 cm (centimeter) and millimeter waves of 35 GHz have a wavelength about L=8.6 mm (millimeter). Thus cables act as area reflectors and will reflect any polarization waves.

Therefore, prior art radar using millimeter waves cannot use a structure and method based on the polarization effect as disclosed in the present invention.

To apply the present invention to wire detection, a frequency low enough for the wires to appear as thin wires is required, that is the frequency of operation should be lower than a certain value Fmax. That frequency corresponds to a wavelength which is larger than the diameter of cables to be detected. In one embodiment, the wavelength is longer than about three times the diameter of the target wire.

Preferably, the wavelength should be longer than about 6 times the diameter of the wire to be detected.

Throughout the present disclosure and claims, it is to be understood that the above considerations apply, regarding the wavelength value vs. the diameter of the cable to be detected.

For example, for 1" or 2.54 cm diameter wires, a recommended wavelength is longer than about 15 cm. This corresponds to a radar frequency of about 2 GHz. A somewhat higher frequency may also be used, but then a nonpolarized component of sizable amplitude appears, and may result in lower detection range or the loss of the unique polarization properties of thin wires.

For better results and a longer detection range, a lower frequency should be used, for example about a 1 GHz value or lower. As the ratio of wavelength to cable diameter increases, the polarization effect is stronger, that is closer to that of an ideal thin wire of zero diameter. This allows for better discrimination of wires with respect to other radar wave scatterers.

Figure 2A:
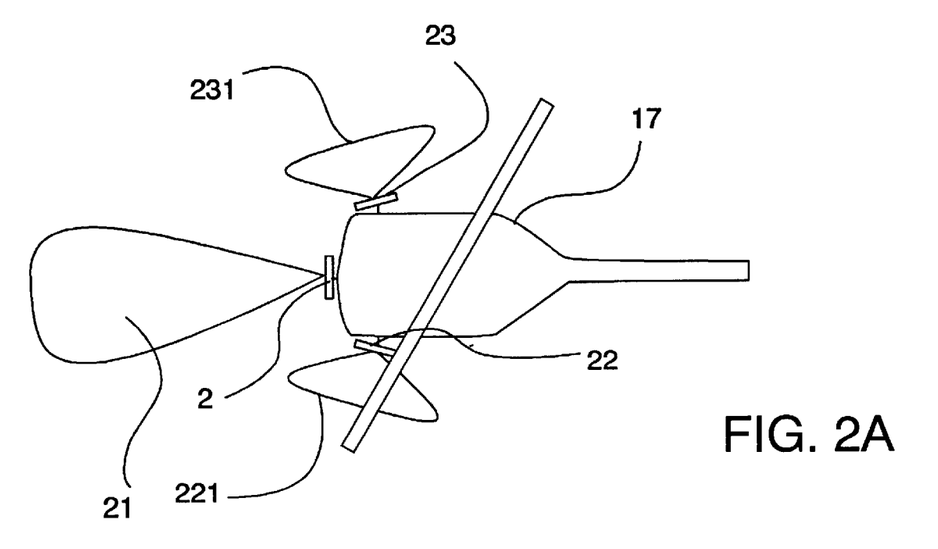
FIG. 2A details the installation of a wire detecting system and the antenna patterns, in a system with one forward lobe, and FIG. 2B details a system with two forward lobes.
Figure 2B:
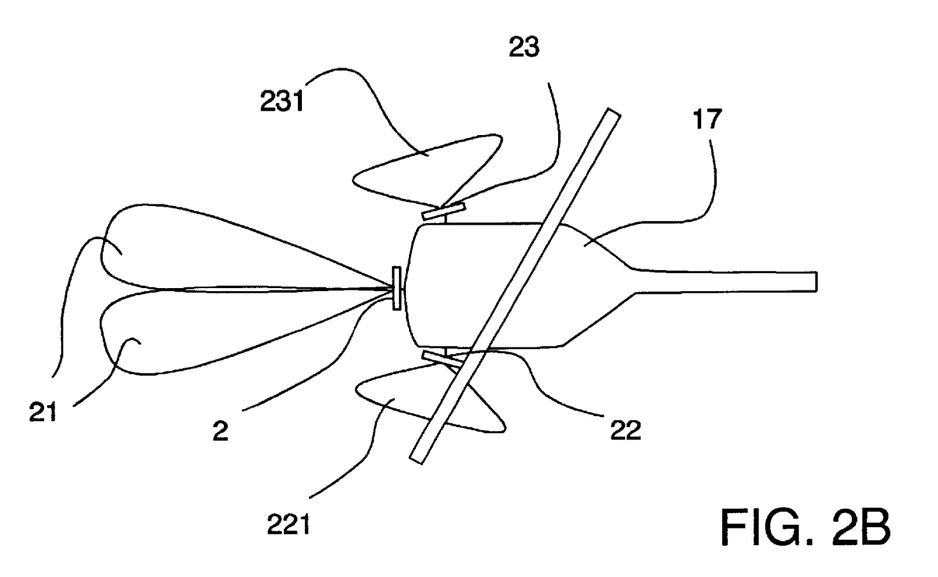

The abovedetailed effects are used in the wire detection system in the present invention to detect and identify wires, that is to distinguish wires from other ground reflectors, as detailed below with reference to FIG. 4. FIGS. 2A–2B detail the installation of antennas of a wire detecting system in a helicopter 17. Here are detailed the directionality characteristics of the antennas. Polarization control means for these antennas is also required according to the present invention; these means will be detailed below with reference to FIGS. 3A–3E FIG. 2A details a system with one forward lobe 21 generated in forward antenna 2. This is a highly directional antenna, both in transmission and reception.

A problem in wires detection is to distinguish the wire from ground clutter, since the wire is not moving and there is no Doppler frequency shift relative to the clutter.

Therefore, another property is to be used for detection, that is polarization in the present invention.

As the beam is made narrower, a smaller patch of ground area is illuminated by the transmitter, whereas the wire sector which generates the broadside return remains the same length. Thus, as the beam is made narrower, the ratio $$Dr=Pw/Pc$$

improves (increases), where:

Pw=Return from wire, power of reflected waves
Pc=Return from clutter, power of reflected waves For wire detection, a minimal value of Dr is required, usually about 13 dB. Larger or smaller values may be used, according to the required values of probability of detection and false alarm rate, as well as the post-detection processing parameters.

The wire detection range also depends on the area of ground illuminated by the radar. Thus, in a direction where a longer range is desired, a narrower pattern antenna is preferably used; where the detection range is smaller, a wider pattern antenna may be used.

This is implemented in a preferred embodiment of the invention: since the helicopter 17 is generally moving forward, to achieve a specific time of early warning (before the expected collision with a wire) a longer range is required. Hence the forward antenna 2 having a relatively narrow pattern or lobe 21.

Helicopter 17 may also have a small lateral velocity, therefore a lateral wire detection capability is desired, but only to a smaller range. Therefore side antennas 22, 23 with wide lobes 221, 231 are used.

This structure achieves both long range detection (forward) and wide angle helicopter protection (although at reduced range), to provide an effective protection at low cost. This also results in a smaller size implementation of the system, with fewer components. Weight is an important consideration in helicopters, which cannot tolerate too heavy a load.

This system may be used to detect wires in a forward or lateral direction, to measure the range to the wire and the range rate (the velocity of approaching the wire). From these the expected time to collision may be computed and compared to a threshold or set time value. The system may issue a warning to the pilot when the expected time to collision is smaller than the set value.

Better range resolution may be used to decrease the ground clutter and thus to improve the above defined ratio Dr, as detailed below with reference to FIG. 4

If a wide beam 21 can be used, then it can cover all the azimuth sector where wire detection is desired, for example a total of 15 to 40 degrees. In this case, there may be no need for side antennas 22, 23 and the system will only use a fixed antenna 2 for forward detection.

In another embodiment, the radar may provide full 360 degrees wire detection using wider beamwidth antennas or a plurality of antennas mounted on the helicopter's body.

Other beam widths and/or shapes may be used, according to radar design practices as known in the art and according to the specific desired performance.

FIG. 2B details a system with two forward lobes. The system detailed above may distinguish between wires in a forward or left or right general direction, however it cannot find the precise azimuth to a wire in the forward direction.

To achieve that forward directionality if necessary, in a helicopter 17 there is mounted a forward antenna 2 having a forward lobe pair 21.

The azimuth direction to a wire may be found from the relative amplitudes of the received echo in each of the lobes in lobe pair 21. A lobe switching method may be used, with alternative transmission/reception using each one of the lobes 21. In another embodiment, the phase of the echo received in each of the lobes may be compared to find the direction to wires, as known in the art. In yet another implementation, a combination amplitude/phase may be used.

Various antenna structures may be used to create the two lobes 21, for example a dipole pair with a hybrid to generate sigma-delta signal processing, or a slot array or dipoles array or a horn with dual feed excitation, etc.

Again, side antennas 22, 23 are installed to create detection lobes 221, 231 for lateral detection.

FIGS. 3A–3E illustrate several means for generating and receiving polarized electromagnetic waves. As detailed above, waves reflected off wires have specific polarization characteristics, this allowing to identify wires from the majority of ground clutter reflectors.

The polarization means detailed below apply to antennas installed in helicopters for wire detection as discussed with reference to FIGS. 2A–2B above and elsewhere in the present disclosure.

Figure 3A:
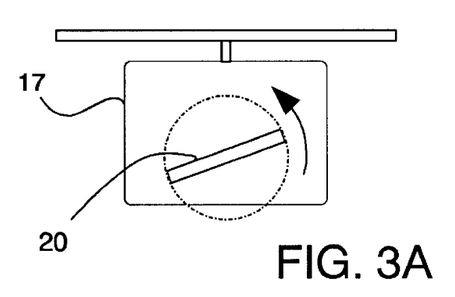

FIG. 3A shows a helicopter 17 wherein the forward antenna 2 (illustrated in FIG. 2A) comprises a rotating dipole 20. Dipole 20 emits and receives waves having a polarization in the direction parallel to the dipole. As the dipole rotates, the polarization of the transmitted waves will rotate accordingly. Means (not shown) to transfer energy to the rotating dipole are required, for example a rotary joint. Also required are means (not shown) to rotate the dipole 20, for example an electric motor. Using a linear dipole 20 both for transmission and reception achieves better polarization selectivity.

Polarization selectivity in the present invention is defined to mean the ratio of the amplitude of a reflected signal at the desired polarization to that of a reflected signal at a different polarization, say at an angle Q with the desired polarization.

Polarization selectivity is a measure of the capability of our system to reject waves of polarization different than that of the dipole, this allowing the system to distinguish between various reflectors according to their polarization characteristics.

This allows to better detect thin wires (that have a linearly polarized echo) and to distinguish these wires against ground clutter and other reflections.

For example, assume there is a reflecting wire at angle Q with dipole 20. The component of transmitted field which is parallel to that wire is E1* cos(Q), where E1 is the total field illuminating the wire. Only that waves component parallel to wire will be reflected back toward the wire detection system.

The amplitude of reflected waves reaching the dipole 20 back is $$K*E1*cos(Q)$$

The reflected waves are polarized at that angle Q, thus the signal received in dipole 20 is again attenuated by cos(Q), to become a received echo of $$Er=K*M*E1*cos(Q)^2$$

where K,M are fixed coefficients.

Thus, waves from reflectors at angle Q with the dipole are attenuated by a factor equal to the square of cos(Q), the angle between the polarization of the reflection and the angle of polarization of dipole 20.

The above factors refer to the multitude of the electric field. The power Pr of the received waves is proportional to the square of the electric field, or the fourth power of cos(Q):

Pr=Z*cos(Q)^4.

The two-way power polarization selectivity with respect to the relative angle Q was computed, using the formulas:

atten=(COS(angle))^4 attdb=10*LOG(atten)

with the following results:

| Angle | Atten. | Atten., dB |
|---|---|---|
| 0 | 1.00000 | 0.0 |
| 5 | 0.98487 | −0.1 |
| 10 | 0.94060 | −0.3 |
| 15 | 0.87051 | −0.6 |
| 20 | 0.77973 | −1.1 |
| 25 | 0.67469 | −1.7 |
| 30 | 0.56250 | −2.5 |
| 35 | 0.45026 | −3.5 |
| 40 | 0.34436 | −4.6 |
| 45 | 0.25000 | −6.0 |
| 50 | 0.17071 | −7.7 |
| 55 | 0.10823 | −9.7 |
| 60 | 0.06250 | −12.0 |
| 65 | 0.03190 | −15.0 |
| 70 | 0.01368 | −18.6 |
| 75 | 0.00449 | −23.5 |
| 80 | 0.00091 | −30.4 |
| 85 | 0.00006 | −42.4 |

For example, if a wire or other target has an angle Q=40 degrees with dipole 20, then the two-way electric field attenuation because of polarization selectivity is cos(20)^2= 0.59.

The power attenuation is 4.6 dB.

Thus, good polarization selectivity is achieved:

A) For a polarization about parallel to a wire (Sector P), within a range of 40 degrees (+−20 degrees about zero) a two-way attenuation of less than 1.1 dB is achieved. Wires will result in strong echoes, with a negligible loss in the polarized antennas.

B) For a polarization about normal to a wire (Sector N), within a range of 40 degrees (+−20 degrees about 90 degrees) a two-way attenuation of more than 18 dB is achieved.

Thus, for a system with modest S/C ratio (for example 14 dB) there will be a distinct difference between echoes from a clutter-only area and an area where a wire returns its polarized wave.

The linear polarization in the radar may be changed in steps of 40 degrees or less. This ensures that, for any wire orientation, there will be reception of echoes in Sector P (strong wire return) and in Sector N (negligibly weak wire return). This will provide for reliable wire detection.

To achieve steps of less than 40 degrees for any orientation of a target wire, five states of the polarization orientation are required. Five states divide a 180 degrees sector into 36 degrees steps. The other 180 degrees sector gives the same polarization results and needs not be scanned. This refers to five states of the antenna, both in transmit and receive.

If less than that number of states is used, the attenuation in Sector P may be larger, and in Sector N—lower than the above values.

Alternately, a linear antenna may be used that rotates continuously, thus scanning all the possible polarization values.

Thus, using a linear polarization antenna both in transmit and receive, at the same polarization orientation, achieves better polarization selectivity than a system which uses polarization only in receive or transmit.

In a preferred embodiment, a linear array is used for the dipole 20, comprising the actual dipole of about a half wavelength, a director in front of the dipole and a reflector behind it, like in Yagi arrays. This structure improves gain and reduces interference from transmission/reception toward the helicopter.

To improve the polarization selectivity, smaller angular steps for the polarization angle are used. It is then guaranteed that part of the cycle the system will measure the deep attenuation close to normal to the wire. Thus, if 20 degrees sectors are used, then the attenuation of 30 dB or more (for angle 80 degrees, that is +−10 degrees about 90 degrees) will be detected.

Polarization selectivity is further detailed with reference to FIG. 4.

Figure 3B:
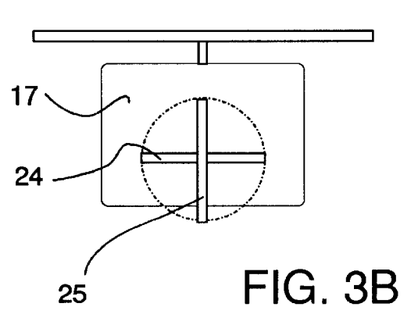

FIG. 3B shows a helicopter 17 wherein the forward antenna 2 (illustrated in FIGS. 2A–2B) comprises a fixed dipole pair, with a horizontal 24 and vertical 25 dipoles.

In one embodiment, antennas 24 and 25 are alternately used to transmit and receive electromagnetic waves. Reflected echo versus range is measured and stored in memory means (not shown), for each polarization- horizontal and vertical. A wire is generally horizontal, and will result in a strong echo at a specific range, which corresponds to the distance to wire (this is the distance normal to wire, for the broadside return from wire as discussed with reference to FIG. 1A.

Thus, when a distinguishable echo in the horizontal antenna 24 only is detected, this indicates a reflection from a horizontal wire. If both antennas 24, 25 receive a similar amplitude of echo, then the reflection is from some ground object other than a wire.

This simple method allows to distinguish horizontal wires from other ground reflectors.

In a preferred embodiment, a linear array is used for each of the dipoles 24, 25, comprising the actual dipole of about a half wavelength, a director in front of the dipole and a reflector behind it. The reflector may be a reflecting plane, like the body of the helicopter or a metallic surface between antenna and the helicopter body. This structure improves gain and reduces interference from transmission/reception toward the helicopter.

Suspended wires are supported from pylons (not shown), which may have a strong return with a vertical polarization. The above system will also detect pylons, only there the vertical echo received in vertical dipole 25 is stronger than the signal in the horizontal dipole 24. Thus, an echo with a vertical polarization is indicative of a pylon.

According to the specific situation, the system may detect horizontal wires, vertical pylons or both. The information may be used to warn the pilot to prevent a collision with wires.

In another embodiment of the invention (not shown), dipoles 24 and 25 are used together to form a linear antenna with any desired polarization, with electronic control to form any instantaneous polarization in transmit and receive.

For transmission, a transmit signal is transferred to each dipole 24, 25 through an attenuator. By attenuating one of the signals a specific value, the total polarization may be changed in a 90 degrees range. Both dipoles receive a signal at the same phase, only the amplitude is changed electronically. For example, if horizontal dipole 24 receives full amplitude and vertical 25 dipole zero, then the transmitted wave has a horizontal polarization; if horizontal dipole 24 receives zero amplitude and vertical 25 dipole full amplitude, then the transmitted wave has a vertical polarization; if both dipoles receive equal amplitudes, the transmitted wave has a 45 degrees polarization. In a preferred embodiment, for each value of a desired polarization angle U each of the vertical channel/horizontal channel will be multiplied by a coefficient A1=cos(U) and A2=sin(U) respectively. These correspond to the components of a vector of unity magnitude and angle U. A fixed magnitude of transmitted signal helps the signal processing to distinguish variations due to the polarization change.

To achieve a full 180 degrees range of polarization change, one of the dipoles may include means for polarity reversal of the signal thereto, for example by exchanging the connection of the two wires to dipole, or other means to multiply by (−1) or other negative value, like −A2 in the above description for a constant magnitude transmitted wave.

In another implementation, two separate power amplifiers may be used, each connected to one of the dipoles 24, 25 and with each of the two channels including an electronically controlled attenuator somewhere in the channel, for example either before or after the power amplifier.

Similar means may be used to change polarization in receive mode, again combining signals received from dipoles 24, 25 coherently in phase, but with a controlled attenuation applied to each signal. Again a polarity reversal of one of the signals together with attenuation control may be used to achieve full 180 degrees change of polarization in receive.

A 180 degrees polarization rotation corresponds to a full circle rotation, since beyond 180 the reflected wave repeats itself, there is no difference in reflected waves for angle U and angle (180+U).

In another implementation, the received signal may be reduced to intermediate frequency IF and the polarization forming be done there. It may be easier to perform at IF the steps of attenuation, polarity reversal and coherent summation of the signals.

Figure 3C:
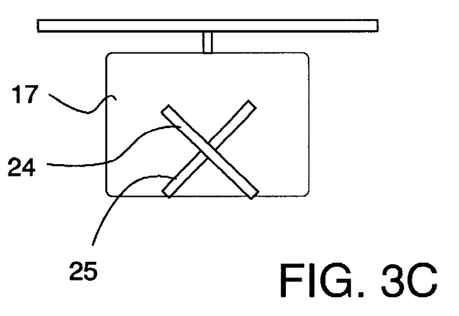

FIG. 3C shows a helicopter 17 wherein the forward antenna 2 comprises a fixed dipole pair rotated 45 degrees, having dipoles 24 and 25 normal to each other.

This may be a preferred implementation for a rotating polarization, since here there is no bias toward any of the dipoles because of ground effects, so a better rotating polarization may be implemented.

Figure 3D:
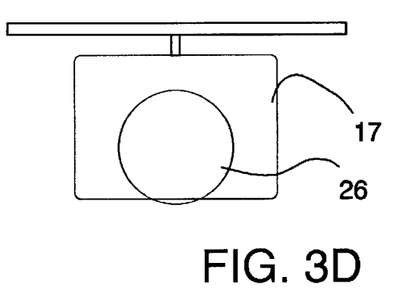

FIG. 3D shows a helicopter 17 wherein the forward antenna 2 comprises a helical dual polarization antenna means 26. The antenna may include (not shown) two helix element, each wound in a direction opposite to the other. Thus, one helix will have a right circular polarization and the other a left polarization. It is possible to apply coherent signals at different phase/amplitude to each helix to generate a linear polarized wave at any desired polarization. Similarly, the received signals may be coherently processed to form a linearly received antenna of any desired polarization.

Figure 3E:
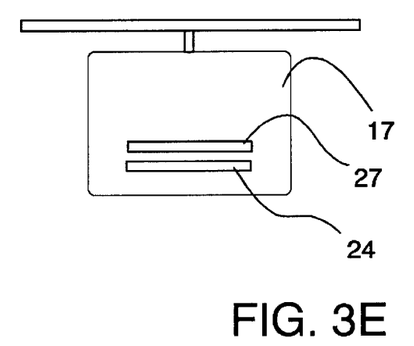
FIG. 3E includes a dipole/slot pair.

FIG. 3E shows a helicopter 17 wherein the forward antenna 2 comprises a dipole/slot pair with dipole 24 and slot 27.

Dipole 24 has a horizontal polarization and slot 27 has a vertical polarization, thus a dual polarization antenna may be formed.

Again, using coherent signal processing as detailed with reference to FIG. 3B, any linear polarization may be achieved.

The dipole and slot may also be vertical or at any other angle, however horizontal may be a preferred angle to prevent hits from the ground or interference with the pilot.

Other antennas may be used (not shown), for example microstrip elements or arrays, a horn or a parabolic reflector.

A microstrip antenna has a gap that transmits/receives a linear polarization. A microstrip antenna with a dual feeder may be used for two polarizations, normal to each other. The microstrip antenna has various advantages, including a robust structure and a low height. It may conform to the helicopter's outer metallic skin. The microstrip antenna does not disturb the aerodynamic properties of a helicopter or light aircraft.

Various antenna means may be used to define a linear polarization at a desired angle Q. The system may then transmit and receive waves at that polarization, at that angle Q.

The means for defining a linear polarization may include:
a. A linear element with mechanical rotation, for example a dipole, slot, linearly polarized horn, Yagi etc.
b. Two linear elements, normal to each other, supplied with signals of the same frequency and phase, but of a controlled relative intensity and polarity. By changing the relative amplitude and polarity, the angle of linear polarization may be controlled electronically. This method may be used in transmission.

For reception, the signals received in two linear orthogonal antennas; are combined, each with a controlled weight (attenuation or amplification). The signals are added coherently (at RF or IF for example) with one of the signals possibly being inverted.

c. A pair of circularly polarized antennas, either mechanically rotated or electronically controlled to transmit/receive a linear polarization with a desired polarization angle.

Figure 4:
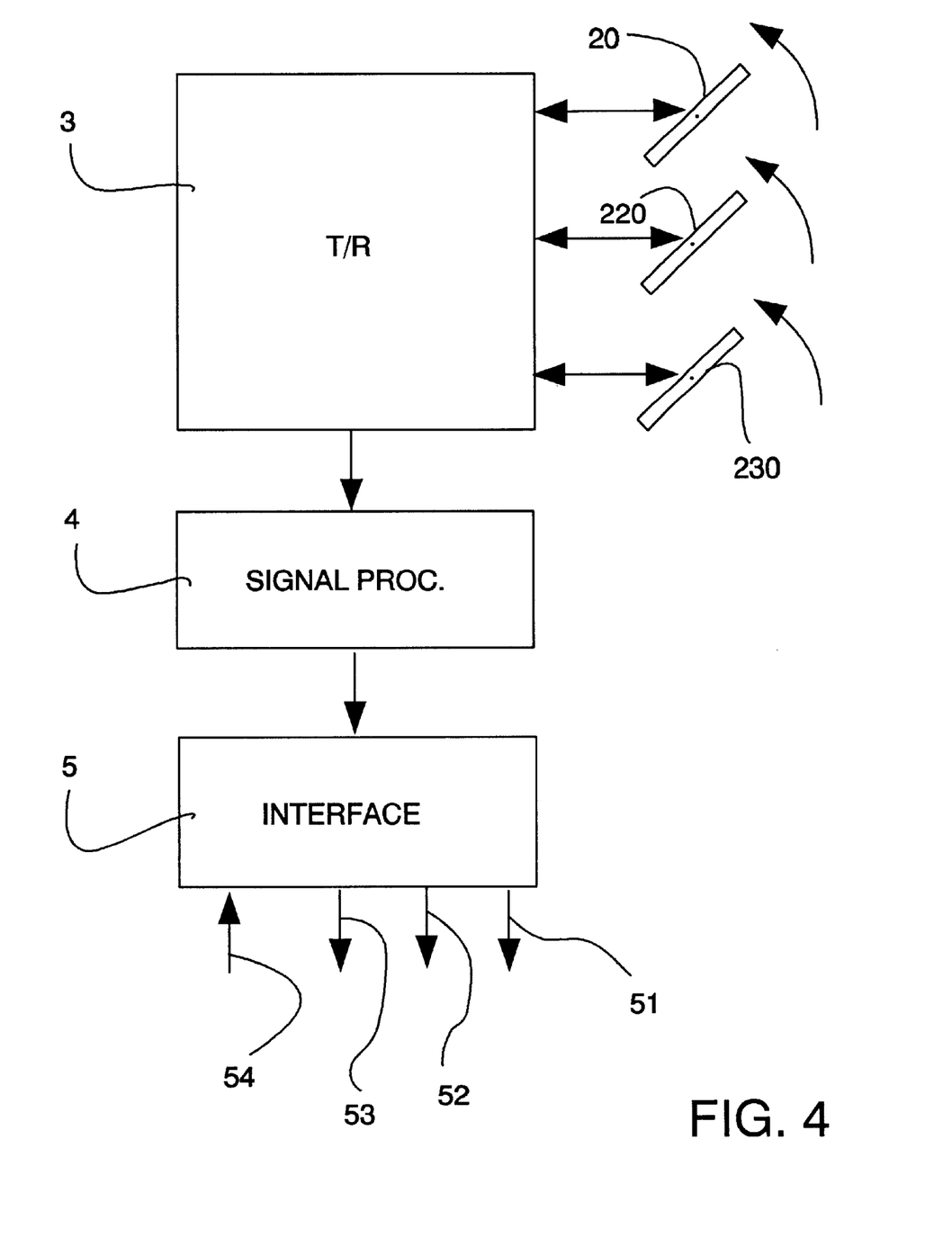
FIG. 4 illustrates the block diagram of the system.

FIG. 4 illustrates an embodiment of the block diagram of the system.

The system includes rotating dipoles 20, 220, 230 corresponding to antennas 2, 22, 23 respectively in FIGS. 2A–2B. The antennas are connected to a transmitter and receiver means 3. In a preferred embodiment, coherent transmitter and receiver (not shown) are used, that is a common master oscillator is used to generate the transmitted signal, the local oscillator and timing signals for pulse generation and signal processing.

A common transmitter/receiver may be used with all the antennas, with the system activating each antenna in turn, in a given time slot, to transmit and receive therewith to detect wires in the angular sector covered by that antenna.

The radar transmitter/receiver 3 may include means to achieve better range resolution. This may be used to decrease the ground clutter and thus to improve the above defined ratio Dr, that is (reflection from wire)/(reflection from clutter).

The area of ground illuminated is $$S = R * FI * c * Dt/2$$

where
S—ground area illuminated by radar, and resulting in ground clutter for a specific cell at range R
R—range
FI—azimuth angle of transmit antenna beam, that is between the −3 dB points of lobe 21 or 221 or 231.
c—velocity of light, c=3E8 m/sec Dt—pulse width One possible method to decrease area S is to decrease the angle Fi, using a narrower beam.

Another method is to use finer range gates, that is smaller Dt. A possible pulse width for narrow beams is about 50 nSec (nanosecond). For better detection or wider beams, the pulsewidth may be decreased to about 10 nSec or lower.

One method of achieving fine range gates is to actually use narrow pulses of electromagnetic radiation. The echo is sampled at range gates whose width is equal to the transmitted pulse width. This may require a relatively high peak power in each pulse, of about 1 Watt or more. Also, advanced components may be used to transmit and receive the narrow pulses.

Alternately, DBS may be used to improve the S/C ratio, as detailed elsewhere in the present disclosure.

Another method is to use spread spectrum techniques, like a stepped frequency pulse as known in the art, or a chirp waveform. This allows to transmit a longer pulse of low power, and to reconstruct the narrow pulse with good resolution in the receiver. Various methods of achieving a fine range gates as known in the art may be used with the present invention, to achieve longer detection range or to allow wider antenna beam 21 or both. Other advantages of spread spectrum include lower transmit power and lower probability of detection by others.

Moreover, this technique may also decrease mutual interference between wire detection systems.

Other means for achieving a directional pattern may be used, for example DBS (Doppler Beam Sharpening), a technique using the Doppler frequency shift of reflected echoes to determine the direction of the echo. Thus, for a helicopter flying at velocity V, echoes from a straight ahead direction will have a maximum Doppler frequency shift; echoes from reflectors at each side of the path will give lower frequency shift, according to the component of the velocity V in that direction.

DBS may be implemented with Fast Fourier Transform (FFT) or other filtering means. For each range gate, the ground echo is divided into segments, each corresponding to a predefined bandwidth.

The system allows to separate ground clutter into segments in azimuth, thus reducing the clutter return in each segment to improve the signal to clutter ratio S/C.

In each segment, polarization processing is performed as detailed elsewhere in the present disclosure.

Use of DBS may help achieve good S/C ratio without too narrow transmit pulses. Thus, the clutter area in each decision segment is divided both in range (pulsewidth settings) and in azimuth (DBS processing). When a wider transmit pulse is possible, the required bandwidth is narrower, this resulting in a simpler, lower cost implementation. The cost is reduced as well. The noise power is also reduced.

A signal processing means 4 may include (not shown) coherent and noncoherent integration, analog to digital conversion, threshold detection, computations on probable wires and warning decision making according to expected time to collision as detailed above.

The signal processing means 4 may further include means for detecting wires based on the thin wire assumption, as detailed elsewhere in the present disclosure.

A frequency low enough for the wires to appear as thin wires is required, that is the frequency of operation should be lower than a certain value Fmax.

The abovedetailed effects are used in the wire detection system in the present invention to detect and identify wires, that is to distinguish wires from other ground reflectors.

A possible signal processing method is similar to the MTI (Moving Target Indicator) now in use. Here, however, the target is distinguished not from variations in echo strength because of its movement, but from variations in echo strength because of polarization of the transmitted wave.

Using a linear polarization antenna both in transmit and receive, at the same polarization orientation, achieves better polarization selectivity than a system which uses polarization only in receive or transmit. See for example FIG. 3A.

To improve the polarization selectivity, smaller angular steps for the polarization angle are used. It is then guaranteed that part of the cycle the system will measure the deep attenuation close to normal to the wire. Thus, if 20 degrees sectors are used, then the attenuation of 30 dB or more (for angle 80 degrees, that is +−10 degrees about 90 degrees) will be detected.

The system may either use more polarization steps of smaller angle each, or rotate a linear antenna at a slower rotation speed.

At an angle about normal to wire, a deep attenuation in wire echo is achieved. This may indicate a wire. Preferably, the system will compute the ratio of echoes received at normal angles of polarization, that is for example:

R(0)=P(0)/P(90); R(10)=P(10)/P(100); R(20)=P(20)/P(110) . . .

Wire Detection Method 1

In one embodiment of the signal processing in unit 4, the following method may be implemented:

A. measure polarization at a plurality of ranges. At each range, measure the received power for a linearly polarized transmitted wave using a receiver with the same linear polarization orientation, for various angles Q of polarization orientation.

B. compute the ratio R(Q)=P(Q)/P(Q+90), that is the ratio between received power at two polarizations normal to each other. Rather than two normal polarizations, two angles with about normal polarizations may be used.

C. if, for some angle Q, the ratio R(Q) is higher than a predefined value, a wire detection is declared. End of method.

Notes:

1. Step (A) may also include coherent and/or noncoherent integration of the received signals. Integration will reduce the error in the clutter measured values. This is especially useful in locations with strong fluctuations in ground clutter.

As the error in ground clutter measurement is reduced, the probability of a false alarm is reduced, and the probability of a wire detection is enhanced.

2. Step (C) may include the step of measuring the maximal ratio R(Q) for a plurality of range gates, to compute a threshold value T. This is indicative of a possible polarization property of ground clutter. This value T is then used as the predefined value to decide whether a wire is present. For each range cell, measurements in surrounding cells may be used to compute the threshold T value.

Wire Detection Method 2

In another embodiment of the signal processing in unit 4, the following method may be implemented:

A. For each of a plurality of angles U between 0 and 180 degrees:

1. Transmit pulses of electromagnetic waves having a linear polarization at an angle U to horizontal
2. Receive echoes at the same polarization angle U
3. Prepare a map M(U, R) with the magnitude of the received echo for each angle U and each ground cell at range R B. Perform a signal processing of the map M(U, R). If there is a significant difference or ratio between received echoes at normal polarization angles, then a wire detection is declared at that range R. The timing of the detection is recorded, together with the range R and possibly the direction to wire.

C. Check for detected wires whose range R is decreasing. For these wires, compute an expected time to collision according to the range R and the measured rate of range decrease.

D. If the expected time to collision is less than a predetermined value, then issue a warning to user.

End of method.

Notes:

1. In step (B), in one embodiment, if a strong signal is detected in a specific cell which has a close to horizontal polarization, then it is most likely a wire.

If a strong signal is detected in a specific cell which has a close to vertical polarization, then it is most likely an electricity pylon.

It is possible to maintain and update a table of probable wire detection W(U,R,T) and pylon detection P(U,R,T) with parameters the angle of polarization U, range R and time of detection T.

2. If the processing in Note 1 is performed, then it may be followed with a wire detection decision, including processing of tables W(U,R,T) and P(U,R,T), looking for probable targets becoming closer to the system, that is targets whose range R is decreasing with time. For these targets, compute the closing velocity Vc and the expected time to collision Tc according to the formulas:

Vc=(R(T2)−R(T1))/(T2−T1)

Tc=R(T2)/Vc

Where T1 is a previous time when the wire was detected and T2 is a later time when the wire was detected, and R(T2) and R(T1) are range values measured at time T2 and T1, respectively.

Perform the above computations for each probable target and keep a table with the closing velocity and the expected time to collision for each target.

3. Warning issuing in step (D)—if for any one of possible targets being processed in the system, the time to collision is smaller than a specific threshold value Th, then issue a warning to user.

4. Steps A–D may be repeated all the time, including echo measurement for each polarization, signal processing and issuing of a warning according to a predefined algorithm.

5. In another embodiment of step (B) above, a strong signal may be detected in a specific cell which has a linear oblique polarization, that may correspond to a wire at an angle to horizontal.

Algorithms in the radar may be devised to recognize such a slant suspended wire from its characteristic polarization, that is linear at an angle.

6. For detecting the polarization properties of wires, the system transmits multi-polarity waves, that is waves that have more than one linear polarization component.

7. The system uses waves having a wavelength that is longer than the diameter of the wires to detect, to exploit the polarization properties of thin wires.

8. Throughout the present disclosure, algorithms for wire detection also apply for pylons detection, only pylons have a vertical polarization or another characteristic polarization, depending on pylon type.

Pylons support the suspended wires and thus may be indicative of the presence of wires.

Thus, the characteristic polarization of pylons may be advantageously used to distinguish them from normal ground clutter.

If two or more pylons are detected, a method may be used for drawing virtual (computed, assumed) wires therebetween, to present a warning to the pilot.

Alternately, both wire and pylons detection may be used in a radar that detects both. The additional information may be used to achieve a more reliable decision. Thus, a partially reliable wire detection, when combined with a partially reliable pylon detection in a predefined relative location with respect to each other, may be used to achieve a reliable indication of the wire and pylon presence.

In the above algorithm, it is possible to change the polarization angle U in discrete steps (using for example a stepper motor to rotate the antenna 20) or using continuous rotation of antenna 20.

Interface to user means 5 include means to bring a warning to user, and may include (not shown) visual warning means 51, audio warning means 52 and/or other type of warning means 53.

The interface may also include system controls 54 for example an on/off control, audio level or mute, visual display brightness etc.

Although the system as illustrated includes three rotating dipoles 20, 220, 230, it is to be understood that only one dipole 20 may be used for forward detection, that is for an azimuth sector in the forward direction.

This is an important function of the system, since a wire is most likely to appear and be detected in a generally forward direction. The wire detection system may be installed in a helicopter or in a light aircraft, for example, to provide a warning to prevent collision with wires or pylons.

It will be recognized that the foregoing is but one example of an apparatus and method within the scope of the present invention and that various modifications will occur to those skilled in the art upon reading the disclosure set forth hereinbefore.

What is claimed is:

1. A system for wire detection comprising a transmitter means for transmitting multi-polarity waves, means for receiving waves reflected off a target and means for analyzing the polarization of the reflected waves to detect linearly polarized echoes characteristic of wires and to issue a warning indicative of the presence of a wire, wherein the wavelength of the transmitted waves is more than three times the diameter of the wires to be detected.

2. The system for wire detection according to claim 1, wherein the transmitter means includes a rotating linear polarization antenna and the multi-polarity waves comprise waves of rotating linear polarization.

3. The system for wire detection according to claim 2, wherein the rotating linear polarization is implemented with a mechanically rotating antenna.

4. The system for wire detection according to claim 2, wherein the rotating linear polarization is implemented with electronic means.

5. The system for wire detection according to claim 2, wherein the rotating linear polarization antenna is also used in reception, to implement the means for analyzing the polarization of the reflected waves.

6. The system for wire detection according to claim 1, wherein the means for analyzing the polarization of the reflected waves comprise a receive antenna that is linearly polarized in the orientation of the transmitted multi-polarity waves.

7. The system for wire detection according to claim 1, wherein the transmitter means includes means for alternately transmitting through two or more antenna elements, each having a linear polarization in a different orientation, and wherein the multi-polarity waves comprise waves of changing linear polarization.

8. The system for wire detection according to claim 1, wherein the transmitter means includes means for transmitting circularly polarized waves that form the multi-polarity waves.

9. The system for wire detection according to claim 1, wherein the receiver means further include means for DBS processing for reducing the clutter return in each cell.

10. A method for wire detection comprising the following steps, for each of a plurality of angles U between 0 and 180 degrees:

A. Transmit pulses of electromagnetic waves having a linear polarization at an angle U to horizontal B. Receive echoes at the same polarization angle U C. Prepare a map M(U, R) with the magnitude of the received echo for each angle U and each ground cell at range R.

11. The method for wire detection according to claim 10, further including the following step after step (C):

Signal processing of the map M(U, R). If a strong signal is detected in a specific cell which has a close to horizontal polarization, then it is most likely a wire. If a strong signal is detected in a specific cell which has a close to vertical polarization, then it is most likely an electricity pylon, and while maintaining and updating a table of probable wire detection W(U,R,T) and pylon detection P(U,R,T) with parameters the angle of polarization U, range R and time of detection T.

12. The method for wire detection according to claim 10, further including the following step:

Wire detection decision, including processing of tables W(U,R,T) and P(U,R,T), looking for probable targets becoming closer to the system, that is targets whose range R is decreasing with time; for these targets, compute the closing velocity Vc and the expected time to collision Tc.

13. The method for wire detection according to claim 12, wherein the expected time to collision Tc is computed according to the formulas $$Vc=(R(T2)-R(T1))/(T2-T1)$$

$$Tc=R(T2)/Vc$$

and wherein T1 is a previous time when the wire was detected and T2 is a later time when the wire was detected, and R(T2) and R(T1) are range values measured at time T2 and T1, respectively.

14. The method for wire detection according to claim 10, further including the following step:

Issue of a warning, if for any one of possible targets being processed in the system, the time to collision is smaller than a specific threshold value Th, then issue a warning to user.

15. A method for wire detection comprising the following steps:

A. measure polarization at a plurality of ranges, at each range, measure the received power for a linearly polarized transmitted wave using a receiver with the same linear polarization orientation, for various angles Q of polarization orientation;

B. compute the ratio R(Q)=P(Q)/P(Q+90), that is the ratio between received power at two polarizations normal to each other, rather than two normal polarizations, two angles with about normal polarizations may be used;

C. if, for some angle Q, the ratio R(Q) is higher than a predefined value, a wire detection is declared.

\* \* \* \* \*